April 1, 1924.  G. D. SUNDSTRAND  1,488,653

OVERARM

Filed May 3, 1919

Inventor
G. D. Sundstrand

Patented Apr. 1, 1924.

1,488,653

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

OVER-ARM.

Application filed May 3, 1919. Serial No. 294,511.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Over-Arms, of which the following is a specification.

My invention relates to improvements in milling machines and other machine tools, and more specifically to an improvement in overarm attachments for such machines.

One object of my invention is to produce an overarm having the simplest possible shape, cheap to machine and easy to clamp into position.

Another object is to provide on the under surface of said overarm a flat horizontal surface from which measurements to the work on the machine may be easily made for the purpose of adjusting the work.

Another object is to provide an overarm which will take the torsional stresses transmitted to it from other parts of the machine without being slotted or clamped by a friction clamp.

Another object is to provide a simple slideway for said overarm adapted upon removal of said arm to receive other attachments, such, for instance, as those described in my copending application Serial No. 294,512 filed May 3, 1919 (now Patent No. 1,425,717, dated August 15, 1922).

Another object is to provide a simple means for removing an arbor support mounted at the end of said arm from the axial line of the arbor to permit removal of a cutting tool mounted on the arbor.

Other objects and advantages of my invention will become apparent as the description proceeds.

Figure 1:
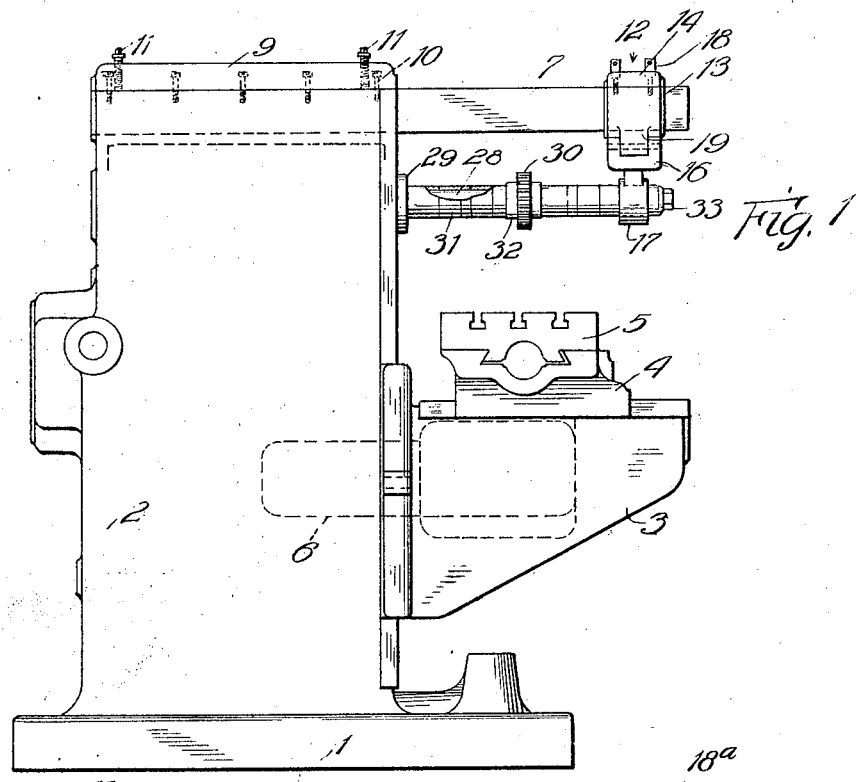
Figure 2:
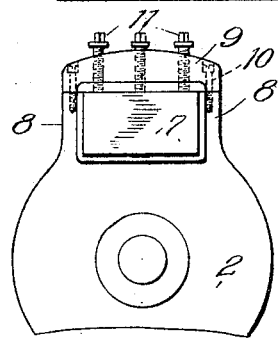
Figure 3:
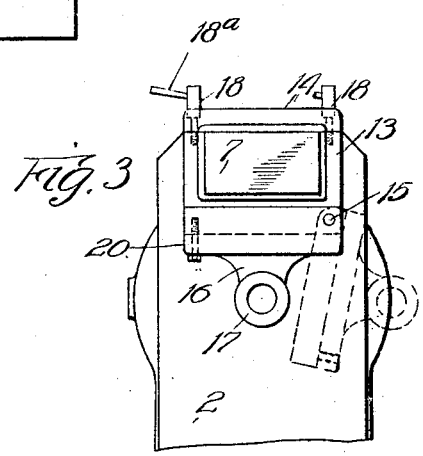
Figure 4:
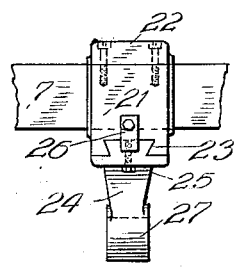
Figure 5:
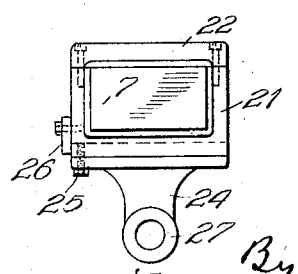

Referring to the accompanying drawings, Figure 1 is a side elevation, and Fig. 2 is a fragmental rear elevation of a milling machine showing the preferred embodiment of my invention. Fig. 3 is a front elevation, the clamp at the top of the main column being omitted for clearness, and Figs. 4 and 5 are a side and end view, respectively, of a modification of the arbor support.

In the drawings, 1 indicates a base, 2 a main column, 3 a knee vertically slidable and adjustable on said column, 4 a saddle on the knee and 5 a table on the saddle. An auxiliary clamp such as described in my copending application Serial No. 273,216, filed January 27, 1919 (now Patent No. 1,430,268, dated September 26, 1922) is indicated in dotted lines at 6.

The overarm 7 slides between the walls 8—8 at the upper end of the column 2, which walls define a rectangular U-slot with its lower side horizontal. The caps 9 fastened to the column 2 by bolts 10 carries suitable screws 11; clamping arm 7 in adjusted position.

An arbor 28, projecting from a live spindle 29, carries a cutting tool 30. The tool is suitably held on the arbor by a series of rings 31, engaging the hub 32 and tightened by a suitable nut 33.

The arbor support, indicated as a whole by the numeral 12, comprises a U-shaped member 13, a cap 14 adapted to clamp the support firmly in position on the overarm 7 upon tightening the bolts 18, and a member 16 suitably pivoted at 15 and having at its lower extremity a bearing 17 adapted to guide and support the arbor.

As shown in Figure 1, the upper surface of part 16 is U-shaped and embraces a rib 19 on the member 13 to maintain said parts rigidly in alignment. A suitable screw 20 fastens the member 16 in its operative position.

In the modification shown in Figs. 4 and 5, the arm 7 carries the U-shaped member 21 secured by the cap 22 and having guides at 23. A downwardly extending member 24 is slidably mounted in said guides and carries a bearing 27 to receive the arbor 28. Suitable clamping means for the member 24 are provided as, for instance, a screw 25 engaging the surface of the guide 23. A stop 26 at one end of the guide permits quick adjustment of member 24 in exact alignment with the arbor 16.

It will be seen that the overarm 7 is the simplest form adapted to take torsion from clamping surfaces engaging it without the use of a slot or friction clamp. Also that it provides a wide horizontal surface parallel to the plane of the work table directly over the work from which a workman can conveniently measure distances in adjusting the work and the cutter. Any plane of the overarm having a definite angular relation to the work may be used as a reference plane in alining the work and such reference plane may be suitably finished to adapt it for that purpose. The overarm 7 may be easily and quickly removed from the slot leaving the column 2 adapted to receive any other suitable attachment in its place. The planes of the overarm serve as suitable guideways for the slide or frame 13 whereby the bearings 17 or 27 can be moved to an inoperative position. The bearing 17 may be removed by withdrawing the pivot pin at 15, to put another bearing of different size in its place. Similar removal of bearing 27 may be quickly accomplished by merely loosening the clamping screw 25.

In my illustration the slidable frame upon the overarm has an opening corresponding with the shape of the overarm. It is obvious that this disclosure is not essential to the invention, it being sufficient that certain portions of the cross section of both coincide in a manner such that the frame is non-rotatable upon the arm.

While I have described a rectangular overarm, I do not wish to be limited to the one form illustrated. For certain purposes of the invention herein set forth any non-circular or angular overarm will suffice, while for all purposes the rectangular overarm gives additional advantages. In other embodiments of my invention which may occur to those skilled in the art, all the advantages of my invention may obtain and therefore I desire to be limited not by the foregoing description and disclosure but by the scope of the appended claims as limited by prior art.

I claim as my invention:

1. A machine tool having, in combination, a work table, a body, an arm extending from said body, a frame slidable on said arm, the arm having a uniform non-circular cross section throughout its length and having one plane surface parallel to the plane of the work table, the frame having an opening with a non-circular cross section, the cross section of the arm being adapted to coincide with numerous portions of the cross section of the frame opening whereby the frame is non-rotatable on the arm, the arm having one or more plane faces in a predetermined angular relation to the plane of the work table of the machine tool.

2. In a machine tool, in combination, a body, a rotary member projecting from said body, an arm projecting from said body, a frame slidable parallel to the axis of said rotary member on said arm, a support pivoted on a horizontal axis to said frame so as to swing laterally away from the axis of said rotary member, and means for clamping said support in alinement with said rotary member.

3. A milling machine having, in combination, an arbor, a member of angular cross-section overlying said arbor, a frame slidable on said overhanging member, a downwardly extending means on said frame for guiding and supporting said arbor, said means being pivoted to said frame to swing away from its operative position in alignment with said arbor, and means for clamping said supporting means in its aligned and operative position.

4. In combination, a supporting member provided with guide ways, a member adjustably arranged to move upon the guide ways of said supporting member, and a bearing member hingedly connected thereto.

5. In combination, a supporting member provided with guide ways, a slide member adjustably arranged to move upon the guide ways of said supporting member, means to clamp said slide to said guide ways, a bearing member hingedly connected to said slide, and clamping means to secure the bearing member to the slide.

6. A machine tool having, in combination, a work table, a body with a groove therein, a cover adapted to close said groove, means for securing said cover whereby the groove and the surface of the cover closing the groove form a non-circular opening in the body, an arm extending from said body held in said opening, said arm having one plane surface parallel with the plane of the work table and also having a uniform cross section throughout its length adapted to coincide with numerous portions of the cross section of the opening whereby the arm is held therein against rotation.

7. In a machine tool, in combination, a body, a member rotatable about its axis and projecting from said body, an arm rigid with said body projecting therefrom, a frame slidable on said arm parallel to the axis of said member, and a support for the free end of said member normally carried by said frame in alinement with said member but releasable for pivotal movement out of alinement with said member in a plane perpendicular to said member.

8. A machine tool having, in combination, a member of non-circular cross-section; a frame slidable lengthwise of, but non-rotatable upon, said member; means to secure said frame immovably to said member; an arbor bearing movably connected to said frame; and means to lock said bearing against movement with relation to said frame.

9. A machine tool having, in combiantion, a body, a work table on said body moving in a plane, a rotary member projecting from said body, an arm projecting from said body parallel to the rotary member, a bearing carried by the arm to support the rotary member, the arm having a uniform rectangular cross section throughout its length with a plane surface parallel to the plane of motion of the table, the arm having one or more of its plane surfaces adapted for use as reference planes for the work on the table.

10. In a machine tool, in combination, a body, a rotary member projecting from said body, an arm projecting from said body parallel to the rotary member, the arm having a uniform cross section throughout its length, a frame non-rotatable on the arm and slidable on the arm parallel to the axis of said rotary member, a bearing carried by said frame to support the end of the rotary member, and pivotal means for swinging said bearing out of alinement with the rotary member.

In testimony whereof, I have hereunto set my hand.

GUSTAF DAVID SUNDSTRAND.